US010511878B2

(12) United States Patent
Li et al.

(10) Patent No.: US 10,511,878 B2
(45) Date of Patent: *Dec. 17, 2019

(54) SYSTEM AND METHOD FOR PROVIDING CONTENT IN AUTONOMOUS VEHICLES BASED ON PERCEPTION DYNAMICALLY DETERMINED AT REAL-TIME

(71) Applicant: Baidu USA LLC, Sunnyvale, CA (US)

(72) Inventors: Liyun Li, San Jose, CA (US); Shaoshan Liu, Fremont, CA (US); Shuang Wu, Fremont, CA (US); James Peng, Fremont, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/993,123

(22) Filed: May 30, 2018

(65) Prior Publication Data
US 2018/0278982 A1 Sep. 27, 2018

Related U.S. Application Data

(63) Continuation of application No. 15/199,378, filed on Jun. 30, 2016, now Pat. No. 10,015,537.

(51) Int. Cl.
H04N 21/414 (2011.01)
B60R 11/04 (2006.01)
(Continued)

(52) U.S. Cl.
CPC ....... H04N 21/41422 (2013.01); B60R 11/04 (2013.01); G06F 16/5866 (2019.01);
(Continued)

(58) Field of Classification Search
CPC .......... H04N 21/41422; H04N 21/251; H04N 21/2668; H04N 21/4223; H04N 21/44218; H04N 21/44222; H04N 21/4532
See application file for complete search history.

(56) References Cited

U.S. PATENT DOCUMENTS 9,043,072 B1  5/2015  Tisdale et al.
9,098,529 B1  8/2015  Seth et al.
(Continued)

FOREIGN PATENT DOCUMENTS

JP  2009152719      7/2009
JP  2010237411 A   10/2010
(Continued)

Primary Examiner — Pinkal R Chokshi
(74) Attorney, Agent, or Firm — Womble Bond Dickinson (US) LLP

(57) ABSTRACT

In one embodiment, an image analysis is performed on an image captured using a camera mounted on an autonomous vehicle, the image representing an exterior environment of an autonomous vehicle. Localization information surrounding the autonomous vehicle is obtained at a point in time. A perception of an audience external to the autonomous vehicle is determined based on the image analysis and the localization information. One or more content items are received from one or more content servers over a network in response to the perception of the audience. A first content item selected from the one or more content items is displayed on a display device mounted on an exterior surface of the autonomous vehicle.

21 Claims, 6 Drawing Sheets

(51) Int. Cl.
  *G06K 9/00* (2006.01)
  *G06F 16/58* (2019.01)
  *G09F 21/04* (2006.01)
  *H04N 7/18* (2006.01)
  *H04N 21/25* (2011.01)
  *H04N 21/2668* (2011.01)
  *H04N 21/4223* (2011.01)
  *H04N 21/442* (2011.01)
  *H04N 21/45* (2011.01)
  *G06T 7/70* (2017.01)
  *H04L 29/08* (2006.01)

(52) U.S. Cl.
  CPC ............ *G06K 9/00791* (2013.01); *G06T 7/70* (2017.01); *G09F 21/04* (2013.01); *H04N 7/183* (2013.01); *H04N 21/251* (2013.01); *H04N 21/2668* (2013.01); *H04N 21/4223* (2013.01); *H04N 21/44218* (2013.01); *H04N 21/44222* (2013.01); *H04N 21/4532* (2013.01); *H04L 67/12* (2013.01)

(56) References Cited

U.S. PATENT DOCUMENTS

| | | | |
|---|---|---|---|
| 9,235,941 B2 | 1/2016 | Ricci | |
| 9,476,970 B1 | 10/2016 | Fairfield et al. | |
| 9,563,201 B1* | 2/2017 | Tofte | G05D 1/0038 |
| 9,602,193 B1 | 3/2017 | Mendelson | |
| 2002/0049635 A1 | 4/2002 | Mai | |
| 2005/0002558 A1 | 1/2005 | Franke et al. | |
| 2006/0143082 A1 | 6/2006 | Ebert | |
| 2012/0066705 A1 | 3/2012 | Harada | |
| 2012/0069136 A1 | 3/2012 | Smith | |
| 2012/0098977 A1 | 4/2012 | Striemer | |
| 2013/0042261 A1 | 2/2013 | Tavormina | |
| 2013/0138508 A1 | 5/2013 | Gee | |
| 2014/0052537 A1 | 2/2014 | Garnet | |
| 2014/0059704 A1 | 2/2014 | Kamada | |
| 2014/0085470 A1 | 3/2014 | Sako | |
| 2014/0309863 A1* | 10/2014 | Ricci | G01C 21/3484 701/36 |
| 2015/0025975 A1 | 1/2015 | Wallach | |
| 2015/0094897 A1* | 4/2015 | Cuddihy | B60R 11/0229 701/23 |
| 2015/0220991 A1 | 8/2015 | Butts | |
| 2015/0347840 A1 | 12/2015 | Iida | |
| 2015/0348112 A1 | 12/2015 | Ramanujam | |
| 2016/0171015 A1 | 6/2016 | Karlsson | |
| 2016/0182617 A1 | 6/2016 | Mengle et al. | |
| 2017/0137032 A1 | 5/2017 | Wuthnow | |
| 2017/0309863 A1 | 10/2017 | Ricci | |

FOREIGN PATENT DOCUMENTS

| | | |
|---|---|---|
| JP | 2016065938 A | 4/2016 |
| KR | 20130089818 | 8/2013 |
| KR | 20140000032 | 1/2014 |
| KR | 20150108817 | 9/2015 |

* cited by examiner

SYSTEM AND METHOD FOR PROVIDING CONTENT IN AUTONOMOUS VEHICLES BASED ON PERCEPTION DYNAMICALLY DETERMINED AT REAL-TIME

RELATED APPLICATIONS

This application is a continuation application of a co-pending U.S. patent application Ser. No. 15/199,378, filed Jun. 30, 2016, which is incorporated by reference herein in its entirety.

FIELD OF THE INVENTION

Embodiments of the present invention relate generally to content searching and delivery. More particularly, embodiments of the invention relate to content searching and delivery in an autonomous vehicle based on perception.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers. Thus, autonomous vehicles give passengers, especially the person who would otherwise be driving the vehicle, the opportunity to do other things while travelling. Instead of concentrating on numerous driving-related responsibilities, the driver may be free to watch movies or other media content, while riding in an autonomous vehicle.

In addition, autonomous vehicles are usually equipped with more sensors and thereby have better context information when comparing to delivering content on traditional vehicles. The doors and windows of autonomous vehicles are no longer essential given that autonomous vehicles usually operate on sensor information rather than actual vision knowledge obtained through windows.

However, conventional content delivery systems in an autonomous vehicle typically provide static content to users without considering real-time environment in which the autonomous vehicle is operating. The delivered content may or may not be interesting to the audience.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
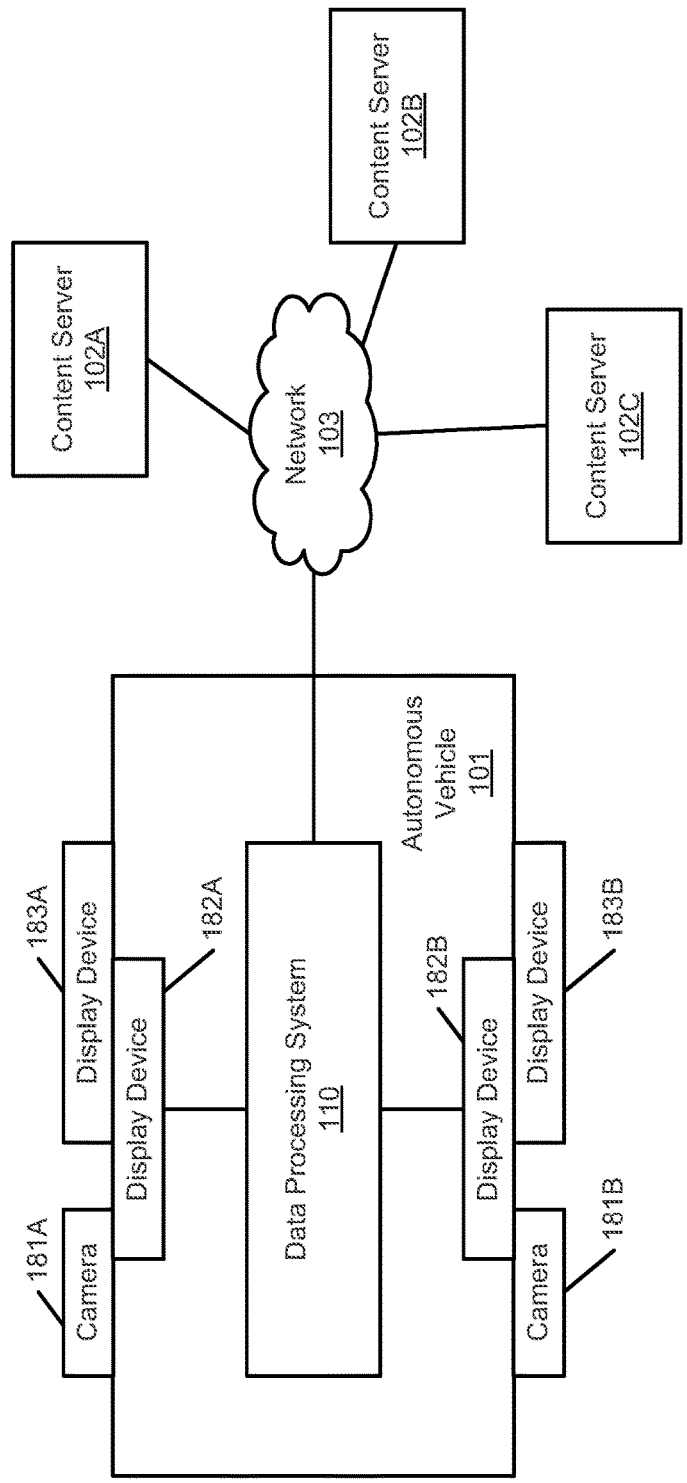
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a content delivery system of an autonomous vehicle takes into consideration of the unique setting of passengers in transit inside the autonomous vehicle and audience outside of the autonomous vehicle. The content delivery system addresses the problem of effectively delivering dynamic content to the exterior audience in the scenario of autonomous vehicle, by leveraging state-of-art display-based content technologies, augmented-reality enhancements, and autonomous car unique information as well. In essential, an autonomous vehicle could be treated as a mobile content display platform where unique context-aware media content could be rendered given the surrounding information captured by sensors (e.g., cameras) attached to the autonomous vehicle.

According to one embodiment, an image analysis is performed on an image captured using a camera mounted on an autonomous vehicle. The image represents or describes an exterior environment of an autonomous vehicle. Localization information surrounding the autonomous vehicle at a point in time is obtained. Examples of the localization information may include location and route information, map and point of interest (MPOI) information, and real-time traffic information at the point in time the image was captured. A perception of an audience external to the autonomous vehicle is determined based on the image analysis and the localization information. One or more content items are received from one or more content servers over a network in response to the perception of the audience. At least one of the content items is selected from the one or more content items and displayed on a display device mounted on an exterior surface of the autonomous vehicle.

In a particular embodiment, the perception information is transmitted to a content exchange platform over a network. The content exchange platform hosts a content exchange or bidding forum to allow multiple content providers to submit a bid based on the perception information to deliver their respective content. The contents are ranked either by the exchange platform and/or by the autonomous vehicle to select a final content candidate or candidates to be displayed on one or more display devices mounted on an external surface of the autonomous vehicle. The displayed content may be specifically selected and tailored to the external audience (e.g., people looking at the display device(s) mounted outside of the autonomous vehicle). In one embodiment, the display device displaying content is mounted on the same surface or on the same direction or orientation as of the camera that captured the image, from which the content was identified and selected. As a result, the displayed content can be tailored to the same audience captured by the camera. The techniques can also be applicable to the internal audience of the autonomous vehicle.

FIG. 1 is a block diagram illustrating a content delivery system for an autonomous vehicle according to one embodiment of the invention. Referring to FIG. 1, autonomous vehicle 101 includes, but is not limited to, an array of sensors such as cameras 181A-181B mounted on a exterior surface of autonomous vehicle 101 and data processing system 110 coupled to the sensors to capture images of an external environment surrounding autonomous vehicle 101. Data processing system 110 processes the captured information obtained from the sensors and communicate with one or more remote content providers, such as content servers 102A-102C.

Data processing system 110 analyzes the captured information to derive a perception from an audience's point of view (e.g., internal audience riding within autonomous vehicle 101 and/or external audience standing outside of autonomous vehicle 101). Data processing system 110 then communicates with content servers 102A-102C or a content exchanging platform hosting content servers 102A-102C to receive content to be displayed on any of display devices associated with autonomous vehicle 101, such as internal display devices 182A-182B and/or external display devices 183A-183B. The content displayed on internal display devices 182A-182B may be identified and rendered tailored to the audience within autonomous vehicle 101 (e.g., virtual reality and/or augmented content). The content displayed on external display devices 183A-183B may be identified and rendered tailored to the audience outside of autonomous vehicle 101 (e.g., content compiled based on the external settings or theme surrounding the external audience at the point in time).

Figure 2:
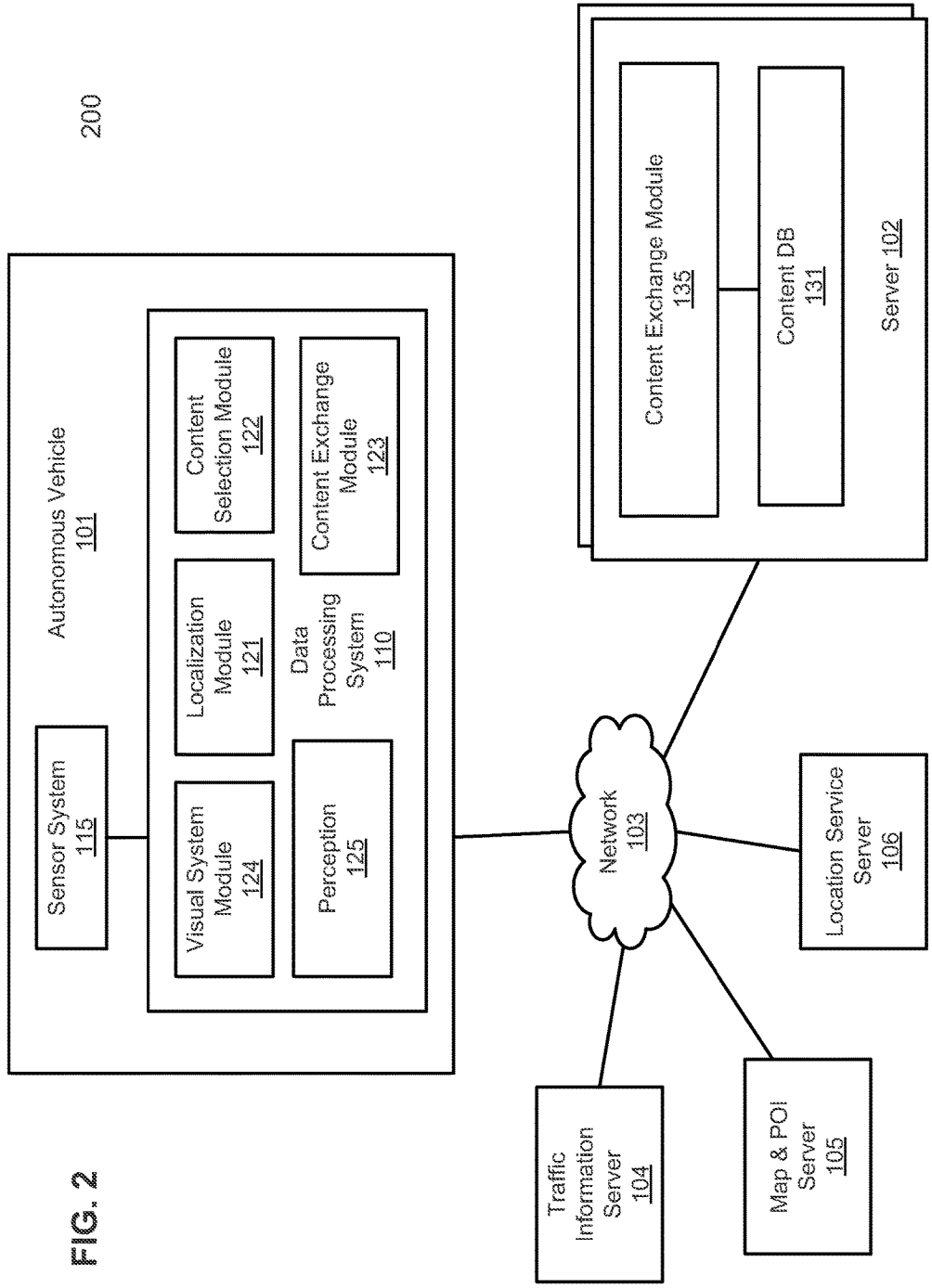
FIG. 2 is a block diagram illustrating an autonomous vehicle network configuration according to one embodiment of the invention.

FIG. 2 is a block diagram illustrating an autonomous vehicle network configuration according to one embodiment of the invention. Referring to FIG. 2, network configuration 200 includes an autonomous vehicle communicatively coupled to one or more servers 102 (e.g., content servers) over a network 103. Although there is one autonomous vehicle shown, multiple autonomous vehicles can be coupled to server 102 over network 103. Network 103 may be any type of networks such as a local area network (LAN), a wide area network (WAN) such as the Internet, a cellular network, a satellite network, or a combination thereof, wired or wireless. Server(s) 102 may be any kind of servers or a cluster of servers, such as Web or cloud servers, application servers, backend servers, or a combination thereof.

In one embodiment, autonomous vehicle 101 includes, but is not limited to, sensor system 115 and data processing system 110. Sensor system 115 includes a variety of sensors or sensing devices that are required in order to enable autonomous vehicle 101 to navigate various roads and places. For example, sensor system 115 may include one or more cameras, a microphone, a global positioning system (GPS), an internal measurement unit (IMU), a radar system, and/or a light detection and range (LIDAR) system. Data processing system 110 is communicatively coupled to sensor system 115, for example, via a bus, an interconnect, or a network. Data processing system 110 is operable to process any data received from sensor system 115 and to manage or control sensor system 115. Data processing system 110 may be a dedicated computer equipped with necessary software and hardware to process information received from sensor system 115 and to control and drive autonomous vehicle 101.

In one embodiment, data processing system 110 includes, but is not limited to, localization module 121, content selection module 122, content exchange module 123, visual system module (VSM) 124, and perception module 125. Modules 121-125 may be implemented in software, hardware, or a combination thereof. For example, modules 121-125 may be loaded into a system memory and executed by one or more processors of data processing system 110. Localization module 121 (also referred to as a trip module) manages any data related to a trip of a user. A user may log in and specify a starting location and a destination of a trip, for example, via a user interface. Localization module 121 communicates with other components of autonomous vehicle 101 to obtain the trip related data. For example, localization module 121 may obtain location and route information from location server 106 and map and POI (MPOI) server 105. Location server 106 provides location services and MPOI server 105 provides map services and the POIs of certain locations. During traveling of autonomous vehicle 101 along the route, localization module 121 may also obtain real-time traffic information from traffic information system or server (TIS) 104. Note that servers 104-106 may be operated by a third party entity. Alternatively, the functionalities of servers 104-106 may be integrated with server 102.

According to one embodiment, in response to an image captured by sensor system 115, VSM module 124 performs an analysis on the image to derive image metadata describing the image. VSM module 124 may perform an image recognition on the image to determine the content represented by the image (e.g., people, background such as building, sign). Based on the image analysis and localization information obtained by localization module 121, a perception is determined by perception module 125. The perception information is then transmitted by content exchange module 123 to one or more content servers 102 to exchange content provided by content servers 102. In response to the perception information, content exchange module 135 of server 102 searches in content database 131 to identify one or more content items. The perception information may include certain keywords representing the perception. Such keywords may be utilized to identify the content items. For example, there may be keyword-to-content ID mapping table (not shown) to map a particular keyword (e.g., bidword) to a content ID that identifies a content item. The identified content item(s) can then be transmitted back to data processing system 110. Content selection module 122 ranks and selects one or more of the content to be displayed on one or more display devices of autonomous vehicle 101.

Figure 3:
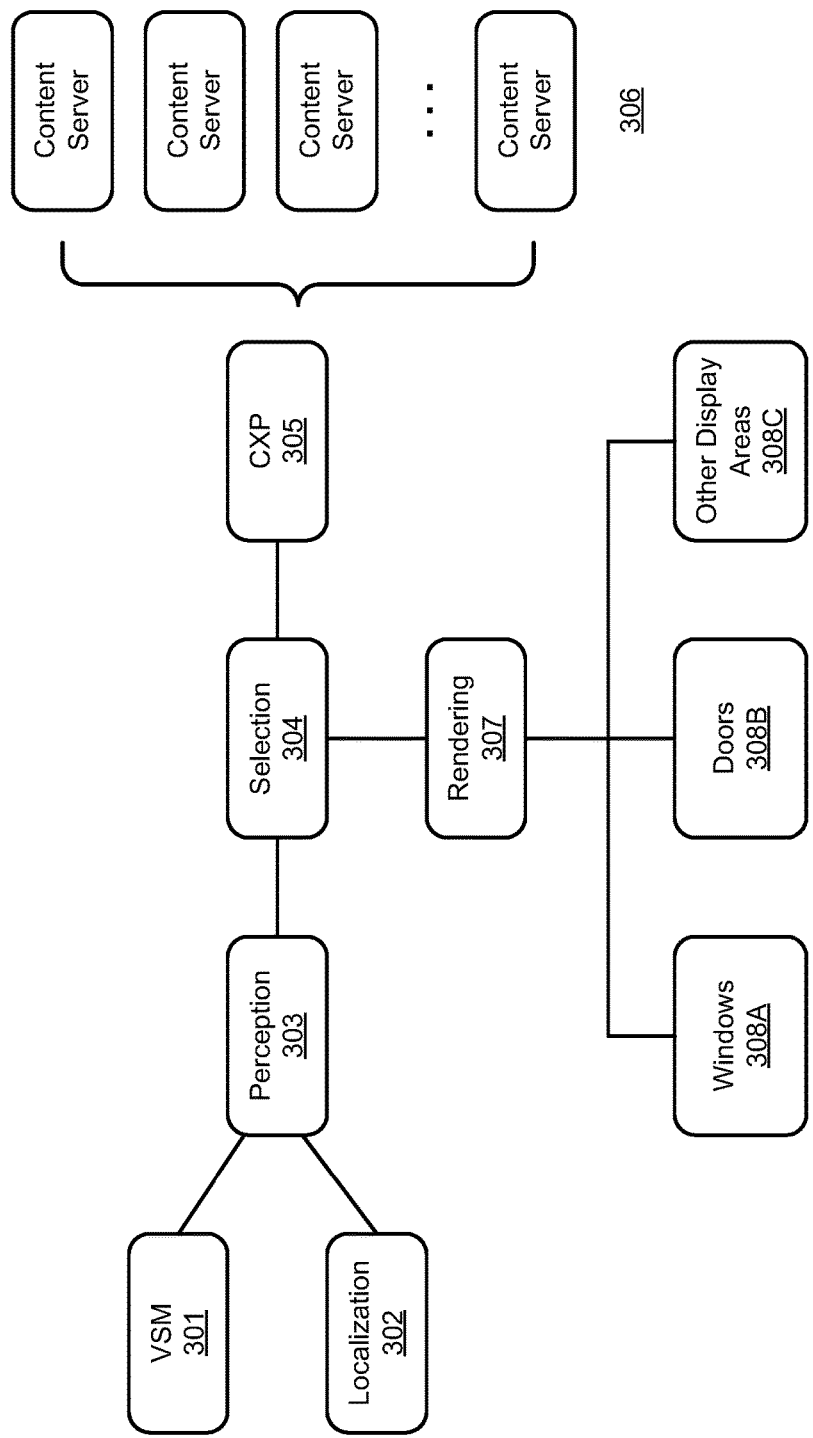
FIG. 3 is a diagram illustrating a model of providing content to audience of an autonomous vehicle according to one embodiment of the invention.

FIG. 3 is a diagram illustrating a model of providing content to audience of an autonomous vehicle according to one embodiment of the invention. Referring to FIG. 3, VSM information 301 obtained by VSM module 124 and localization information 302 compiled by localization module 121 are utilized to develop perception 303 by perception module 125. The perception information can be used in content selection stage 304, in which the perception information is presented to content exchange platform 305. Content exchange platform 305 may be hosted by a third party (e.g., Ads bidding platform) to allow multiple content providers 306 to bid for the content servers. The content provided by content providers 306 are ranked using a predetermined ranking algorithm. One or more content items are then selected and rendered in rendering stage 307 by a content rendering module (not shown). The rendered content can be displayed in a variety of display devices 308A-308C. Display devices 308A-308C may be mounted either internally or externally, dependent upon the specific audience. Content specifically rendered for internal audience may be displayed on a display device mounted within the autonomous vehicle. Likewise, content specifically rendered for external audience may be displayed on a display device mounted on an exterior surface of the autonomous vehicle facing the external audience.

In one embodiment, in preparing content to be displayed in an internal display device, an image captured by a camera is analyzed to recognize a person or object in the image. One or more keywords or a point of interest (POI) related to the recognized image are determined. The content selection module searches and identifies one or more content items based on the keywords, for example, searching in a content database maintained by the autonomous vehicle or by communicating a content exchange platform or content servers in the cloud. Those content items are then ranked and the content selection engine selects at least one of the ranked content items for presentation. The content items are rendered, for example, by augmenting the selected content item onto the image to create an augmented image. A content presentation module presents to the occupant of the vehicle the selected content item that augments the occupant's view of the image at a position relative to a view angle of the image.

The selected content item may be superimposed onto the image to become an augmented image. The augmented image is then displayed on a display device within the autonomous vehicle. The display device may be configured to appear as an ordinary window of a vehicle. When a user looks at the display device, the object of the image is displayed as a virtual object in a virtual reality manner as if the user looked at the physical object through an ordinary window. The display device may display a stream of augmented images (e.g., augmented video) in real time, which is similar or simulates an augmented reality (AR) environment. The display device may include a touch screen to be interactive, such that the occupant may respond to the content item by, for example, completing viewing the content item, taking an action suggested by the content item, making a selection among the choices provided by the content item, or dismissing the content item shortly.

Figure 4:
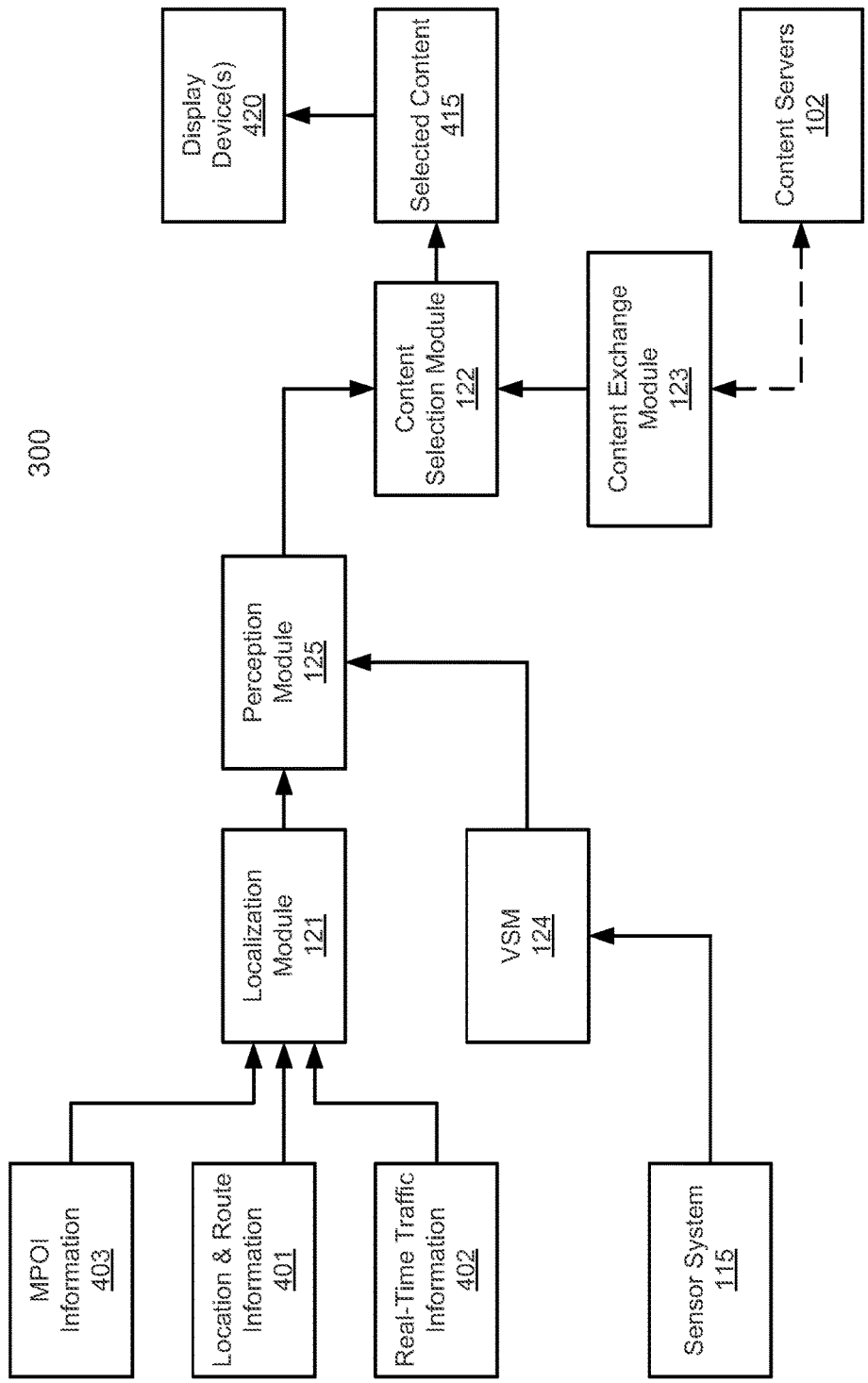
FIG. 4 is a processing flow illustrating a content delivery mechanism of an autonomous vehicle according to one embodiment.

FIG. 4 is a processing flow illustrating a content delivery mechanism of an autonomous vehicle according to one embodiment. Process 400 may be performed by the system configuration as shown in FIGS. 1-2. Referring to FIG. 4, localization module 121 obtains localization information at real-time, such as location and route information 401, real-time traffic information 402, and MPOI information 403. Such information may be obtained from third party information providers such as servers 104-106 of FIG. 2.

In addition, an image captured by sensor system 115 is analyzed by VSM module 124 to compile metadata describing the image. The image represents external environment surrounding the autonomous vehicle. VSM module 124 may perform an image recognition of the image. For example, VSM module 124 may recognize a user as an audience in the environment. VSM module 124 may determine whether a user is an adult or a child, male or female, an activity being performed by the user, etc. VSM module 124 may further recognize a background of the image, such as a building (e.g., shopping mall) and a sign (e.g., billboard) and its content presented therein.

In one embodiment, the localization information and the result of image analysis are provided to perception module 125 to develop a perception under the circumstances. The perception may include a user profile concerning the corresponding audience, which may be dynamically compiled at the point in time based on the localization information and the image analysis. The perception information, as well as the user profile, can be provided to content selection module 122 and/or content exchange module 123. Content exchange module 123 communicates with content providers 102 (e.g., content servers, or content exchange platform hosting the content servers) to exchange content provided by content providers 102. Content exchange module 123 may transmit data representing the perception to content servers 102. The perception data may include standardized terms, keywords, or labels that are agreed upon between content providers 102 and content exchange module 123 (e.g., bidwords).

In one embodiment, the perception information may be transmitted to a content exchange platform (e.g., advertisement or Ads server) to allow the content providers (e.g., advertiser) to bid for the content services (e.g., Ads). In response to the content submitted by content providers 102, a ranking module of content selection module 122 (not shown) ranks the content using a predetermined ranking algorithm, for example, in view of the user profile. One or more content items 415 are then selected and rendered by a content rendering module of content selection module 122 (not shown). The rendered content items are then displayed on one or more display devices 420 facing the targeted audience, for example, a display device mounted on an exterior surface of the autonomous vehicle.

Note that the process as shown in FIG. 4 may be iteratively performed, periodically or continuously. New or updated images captured may be analyzed and localization information may be updated. New or updated content may be identified and retrieved from content providers 102, which may be the same or different content providers from one iteration to another. The new or updated content can then be displayed on the display devices. Some of the content provided by content providers 102 may be cached in a local storage device in a form of a content database and periodically updated from the content providers 102 in the cloud. Such a configuration can cover the situation in which a network connection to the cloud may be temporarily lost.

According to one embodiment, user interactions with the displayed content may be captured by a camera and analyzed by the system. The content may be updated based on the user interactions. For example, a camera may capture an image showing that the user is looking at the content, pointing to the display content, taking a picture of the content, scanning a machine-readable code displayed as part of the content, etc. Such scenario can be used to identify further content in view of the content currently displayed. As a result, the content can be more attractive to the audience at the point in time.

Note that the techniques described above have been described to deliver content to an external audience. The techniques described above can also be used to target the audience within the autonomous vehicle. For example, the display devices mounted within an autonomous vehicle can be used to display images or video captured in real-time representing the external environment in a virtual reality manner. Additional content can be identified from content providers in the cloud using at least some of the techniques described above. The additional content can be augmented onto the images captured in real-time and displayed on a display device mounted within the autonomous vehicle. A display device mounted within the autonomous vehicle may include a touch screen that can be used by a user to interact with the displayed content. Such user interaction can be used to select further content for presentation.

Figure 5:
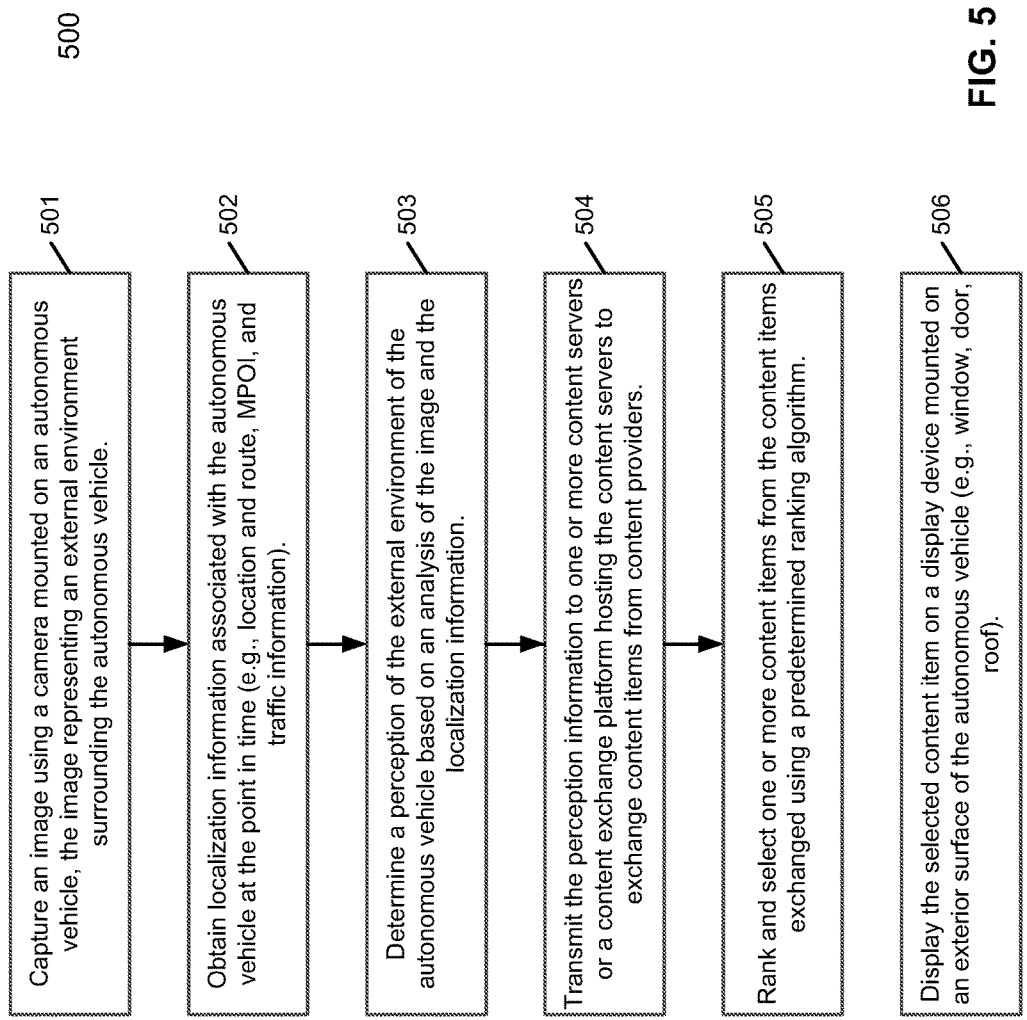
FIG. 5 is a flow diagram illustrating a process of processing content for an autonomous vehicle according to one embodiment of the invention.

FIG. 5 is a flow diagram illustrating a process of processing content for an autonomous vehicle according to one embodiment of the invention. Process 500 may be performed by processing logic which may include software, hardware, or a combination thereof. For example, process 500 may be performed by data processing system 110 of FIG. 2. Referring to FIG. 5, at block 501, processing logic capture an image using a camera mounted on an autonomous vehicle, the image representing an external environment surrounding the autonomous vehicle. At block 502, processing logic obtains localization information (e.g., location and route, MPOI, traffic information) associated with the autonomous vehicle at the point in time. At block 503, processing logic determines a perception associated with the external environment of the autonomous vehicle based on an analysis of the image and the localization information. At block 504, processing logic transmits the perception information to one or more content servers or a content exchange platform hosting one or more content servers to exchange content items form one or more content providers. At block 505, processing logic ranks and selects one or more content items using a predetermined ranking algorithm or content selection method. At block 506, the selected content items are displayed on one or display devices mounted on an exterior surface of the autonomous vehicle (e.g., windows, doors, and roof).

The techniques described throughout this application can be used to provide certain sponsored content, such as advertisements or Ads, to a user riding in an autonomous vehicle, based on the traveling environment at the point in time along a route of a trip (e.g., location and route information, real-time traffic condition, map and point of interests). The sponsored content can also be augmented onto an image or images captured at real-time of the autonomous vehicle's surroundings, creating an augment-reality content delivery environment.

An autonomous vehicle described above refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller use the detected information to navigate through the environment. The sensor system may include one or more cameras, a microphone, a global positioning system (GPS), an internal measurement unit (IMU), a radar system, and/or a light detection and range (LIDAR) system.

A GPS system may estimate a geographic location of the autonomous vehicle. The GPS system may include a transceiver operable to provide information regarding the position of the autonomous vehicle. An IMU unit may sense position and orientation changes of the autonomous vehicle based on inertial acceleration. A radar unit may represent a system that utilizes radio signals to sense objects within the local environment of the autonomous vehicle. In some embodiments, in addition to sensing objects, the radar unit may additionally sense the speed and/or heading of the objects. A LIDAR unit may sense objects in the environment in which the autonomous vehicle is located using lasers. The LIDAR unit could include one or more laser sources, a laser scanner, and one or more detectors, among other system components. A camera may include one or more devices capture images of the environment surrounding the autonomous vehicle. The camera may be a still camera or a video camera. A camera may be mechanically movable such as by rotating and/or tilting a platform to which the camera is mounted. A microphone may be configured to capture sound from the environment surrounding the autonomous vehicle.

An autonomous vehicle may further include a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, estimate the speed of objects, etc.

An autonomous vehicle may further include a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via a user interface. The navigation system may update the driving path dynamically while the autonomous vehicle is in operation. The navigation system can incorporate data from a GPS system and one or more maps so as to determine the driving path for the autonomous vehicle.

An autonomous vehicle may further include a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in a control system to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

An autonomous vehicle may further include a wireless communication system to allow communication between the autonomous vehicle and external systems, such as devices, sensors, other vehicles, etc. within its surrounding environment and/or controllers, servers, etc., which can provide useful information regarding the vehicle's surroundings, such as traffic information, weather information, etc. For example, the wireless communication system can wirelessly communicate with one or more devices directly or via a communication network. The wireless communication system can use any cellular communication network or a wireless local area network (WLAN), e.g., using WiFi. The wireless communication system could communicate directly with a device, for example, using an infrared link, Bluetooth, etc.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
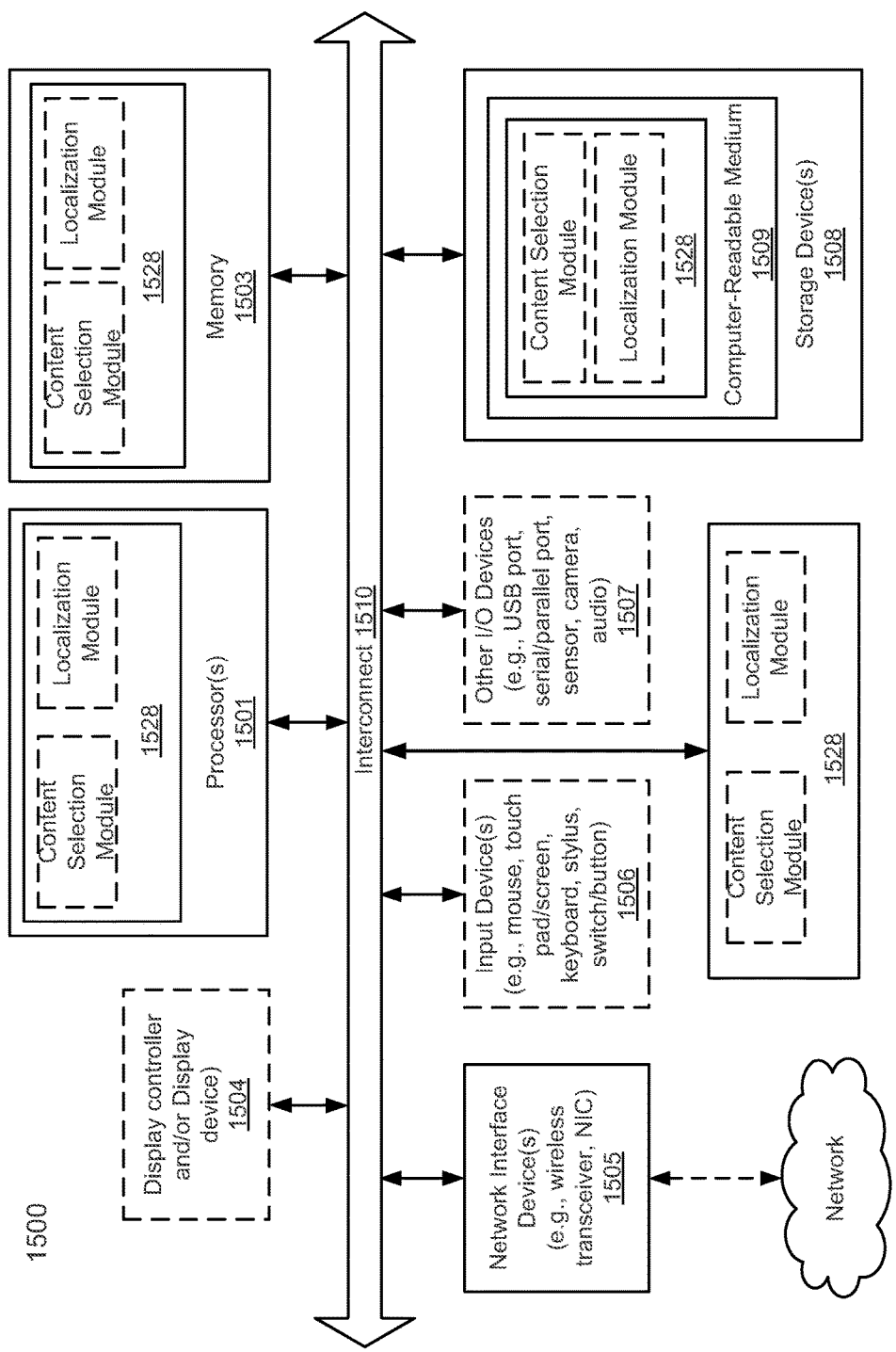
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems described above performing any of the processes or methods described above, such as, for example, data processing system 110 or server 102 of FIG. 2. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for content delivery to an autonomous vehicle, the method comprising:
performing an image analysis on an image captured using a camera mounted on an autonomous vehicle, the image representing an exterior environment of an autonomous vehicle;
obtaining localization information surrounding the autonomous vehicle at a point in time;
determining a perception associated with exterior environment of the autonomous vehicle based on the image analysis and the localization information;
receiving a plurality of content items from one or more content servers over a network in response to the perception associated with the exterior environment of the autonomous vehicle;
ranking the plurality of content items using a predetermined ranking algorithm to select a first content item from the plurality of content items;
superimposing the first content item onto the image captured by the camera, generating an augmented image augmented with the first content item; and
displaying the augmented image on a display device mounted on an interior surface of the autonomous vehicle, wherein the display device includes a touch screen to allow a passenger to interact with one or more choices presented by the first content item, wherein the display device is configured to appear as an ordinary window of the autonomous vehicle, and wherein when the passenger looks at the display device, an object of the augmented image is displayed as a virtual object in a virtual reality manner as if the passenger looked at a physical object through the ordinary window of the autonomous vehicle.

2. The method of claim 1, further comprising transmitting perception information describing the perception to of the one or more content servers to exchange content items provided by the content servers.

3. The method of claim 2, wherein the perception information comprises one or more keywords describing the perception, and wherein the content servers are cloud servers communicatively coupled to the autonomous vehicle over a cloud network.

4. The method of claim 1, wherein the content items are ranked based on a user profile of the passenger.

5. The method of claim 1, wherein the display device is mounted on the same exterior surface of the autonomous vehicle on which the cameras is mounted.

6. The method of claim 1, wherein the camera is a video camera that captures a stream of video frames in real time, and wherein the display device displays a stream of augmented video frames having the first content item augmented thereon.

7. The method of claim 1, further comprising:
caching the first content item in a local content database for subsequent usage; and
periodically updating content items stored in the local content database with the content servers.

8. A non-transitory machine-readable medium having instructions stored therein, which when executed by a processor, cause the processor to perform operations of providing content to autonomous vehicle, the operations including performing an image analysis on an image captured using a camera mounted on an autonomous vehicle, the image representing an exterior environment of an autonomous vehicle;
obtaining localization information surrounding the autonomous vehicle at a point in time;
determining a perception associated with exterior environment of the autonomous vehicle based on the image analysis and the localization information;
receiving a plurality of content items from one or more content servers over a network in response to the perception associated with the exterior environment of the autonomous vehicle;
ranking the plurality of content items using a predetermined ranking algorithm to select a first content item from the plurality of content items;
superimposing the first content item onto the image captured by the camera, generating an augmented image augmented with the first content item; and
displaying the augmented image on a display device mounted on an interior surface of the autonomous vehicle, wherein the display device includes a touch screen to allow a passenger to interact with one or more choices presented by the first content item, wherein the display device is configured to appear as an ordinary window of the autonomous vehicle, and wherein when the passenger looks at the display device, an object of the augmented image is displayed as a virtual object in a virtual reality manner as if the passenger looked at a physical object through the ordinary window of the autonomous vehicle.

9. The machine-readable medium of claim 8, wherein the operations further comprise transmitting perception information describing the perception to of the one or more content servers to exchange content items provided by the content servers.

10. The machine-readable medium of claim 9, wherein the perception information comprises one or more keywords describing the perception, and wherein the content servers are cloud servers communicatively coupled to the autonomous vehicle over a cloud network.

11. The machine-readable medium of claim 8, wherein the content items are ranked based on a user profile of the passenger.

12. The machine-readable medium of claim 8, wherein the display device is mounted on the same exterior surface of the autonomous vehicle on which the cameras is mounted.

13. The machine-readable medium of claim 8, wherein the camera is a video camera that captures a stream of video frames in real time, and wherein the display device displays a stream of augmented video frames having the first content item augmented thereon.

14. The machine-readable medium of claim 8, wherein the operations further comprise:
caching the first content item in a local content database for subsequent usage; and
periodically updating content items stored in the local content database with the content servers.

15. A data processing system, comprising:
a processor; and
a memory coupled to the processor for storing instructions, which when executed by the processor, cause the processor to perform operations of providing content in an autonomous vehicle, the operations including performing an image analysis on an image captured using a camera mounted on an autonomous vehicle, the image representing an exterior environment of an autonomous vehicle, obtaining localization information surrounding the autonomous vehicle at a point in time, determining a perception associated with exterior environment of the autonomous vehicle based on the image analysis and the localization information, receiving a plurality of content items from one or more content servers over a network in response to the perception associated with the exterior environment of the autonomous vehicle, ranking the plurality of content items using a predetermined ranking algorithm to select a first content item from the plurality of content items, superimposing the first content item onto the image captured by the camera, generating an augmented image augmented with the first content item, and displaying the augmented image on a display device mounted on an interior surface of the autonomous vehicle, wherein the display device includes a touch screen to allow a passenger to interact with one or more choices presented by the first content item, wherein the display device is configured to appear as an ordinary window of the autonomous vehicle, and wherein when the passenger looks at the display device, an object of the augmented image is displayed as a virtual object in a virtual reality manner as if the passenger looked at a physical object through the ordinary window of the autonomous vehicle.

16. The system of claim 15, wherein the operations further comprise transmitting perception information describing the perception to of the one or more content servers to exchange content items provided by the content servers.

17. The system of claim 16, wherein the perception information comprises one or more keywords describing the perception, and wherein the content servers are cloud servers communicatively coupled to the autonomous vehicle over a cloud network.

18. The system of claim 15, wherein the content items are ranked based on a user profile of the passenger.

19. The system of claim 15, wherein the display device is mounted on the same exterior surface of the autonomous vehicle on which the cameras is mounted.

20. The system of claim 15, wherein the camera is a video camera that captures a stream of video frames in real time, and wherein the display device displays a stream of augmented video frames having the first content item augmented thereon.

21. The system of claim 15, wherein the operations further comprise:
  caching the first content item in a local content database for subsequent usage; and
  periodically updating content items stored in the local content database with the content servers.

* * * * *